United States Patent
Pearce

[15] 3,673,337
[45] June 27, 1972

[54] REVERTING CALL ARRANGEMENT

[72] Inventor: James Gordon Pearce, Liverpool, England

[73] Assignee: Stromberg-Carlson Corporation, Rochester, N.Y.

[22] Filed: Oct. 12, 1966

[21] Appl. No.: 586,210

[52] U.S. Cl. ..........179/17 D
[51] Int. Cl. ..........H04m 3/02
[58] Field of Search ..........179/17.5

[56] References Cited

UNITED STATES PATENTS

| | | | |
|---|---|---|---|
| 2,541,362 | 2/1951 | Jones | 179/17 |
| 2,604,539 | 7/1952 | Duhamel | 179/17 |

*Primary Examiner*—Kathleen H. Claffy
*Assistant Examiner*—David L. Stewart
*Attorney*—Craig, Antonelli & Hill

[57] ABSTRACT

A reverting call arrangement for a common control telephone system which is automatically connected to the calling line circuit shared by calling and called parties along with the selected dial pulse acceptor or register and includes a control bridge relay forming a d.c. loop with the calling line circuit, reverting call relay means responsive to control from the common control and actuation of the control budge relay for connecting a ringing control providing both calling and call party ringing to the calling line circuit, and holding means for holding connection to the calling line circuit during processing of the reverting call.

10 Claims, 3 Drawing Figures

Patented June 27, 1972 3,673,337

3 Sheets-Sheet 1

INVENTOR
JAMES G. PEARCE

BY Dicke & Craig
ATTORNEYS

INVENTOR
JAMES G. PEARCE

BY Dicke & Craig
ATTORNEYS

INVENTOR
JAMES G. PEARCE

BY Dicke & Craig
ATTORNEYS

REVERTING CALL ARRANGEMENT

The present invention relates in general to communication systems, and more particularly, to a reverting call arrangement for electronic telephone systems.

A call from one party having a given line circuit to another party sharing the same line circuit is commonly referred to as a reverting call, and requires special control of the normal switching functions of the telephone system due to the fact that both the calling and the called subscribers share common equipment. Thus, some means must be provided in the case of a reverting call for recognizing the reverting call situation and for completing the call to the called subscriber in spite of the apparent busy condition of the called line circuit (which is shared by the calling subscriber).

There are several basic types of reverting call systems, the present invention relates to reverting call which is initiated by dialing the directory number of the called party. The calling subscriber then hangs up his receiver and waits while the dial pulse acceptor DPA in response to a calling class of service applies a special signal to the sleeve lead which extends to the line circuit and hence to the line scanner via a coupling diode. A signal indicating that the calling and called lines are the same is then sent to a control. The reverting call equipment is then connected back to the line circuit of the calling party and of the called party and alternately rings both these parties until one of the parties goes off hook. When the called party raises his receiver, the ringing applied to both subscribers is tripped, indicating to the calling subscriber that the called subscriber has answered the ringing. The calling subscriber then raises his receiver and the call is completed between the parties.

It is a principal object of the present invention to provide a reverting call arrangement for electronic telephone switching equipment which is a material improvement over known equipment of a similar nature.

It is another object of the present invention to provide a reverting call arrangement for telephone communication systems capable of effecting the reverting call automatically on receipt of a class of service code in combination with the directory number of the called party.

It is a further object of the invention to provide a new and novel reverting call arrangement for use in connection with the space division electronic switching systems.

Figure 1:
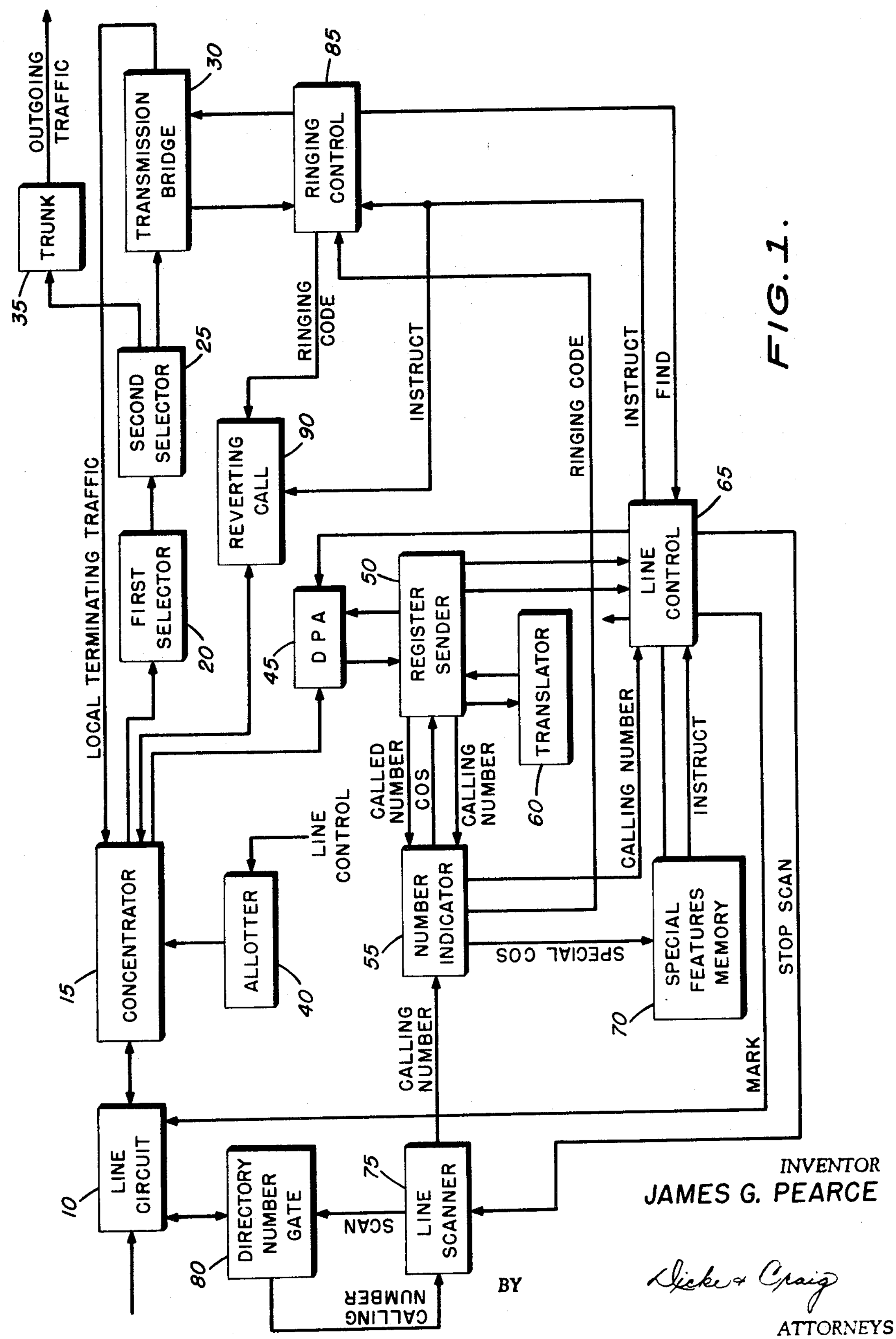
Figure 2A:
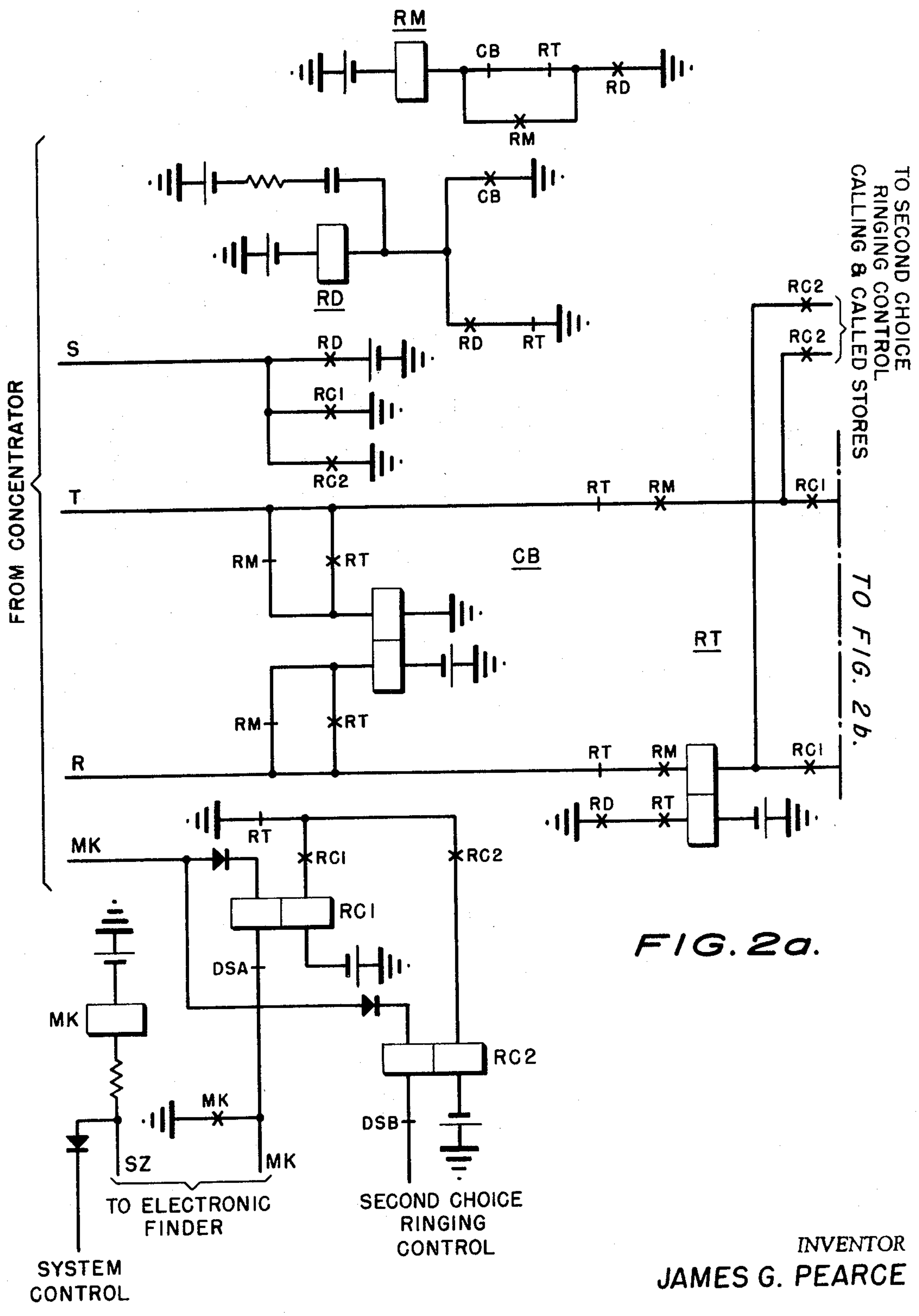
Figure 2B:
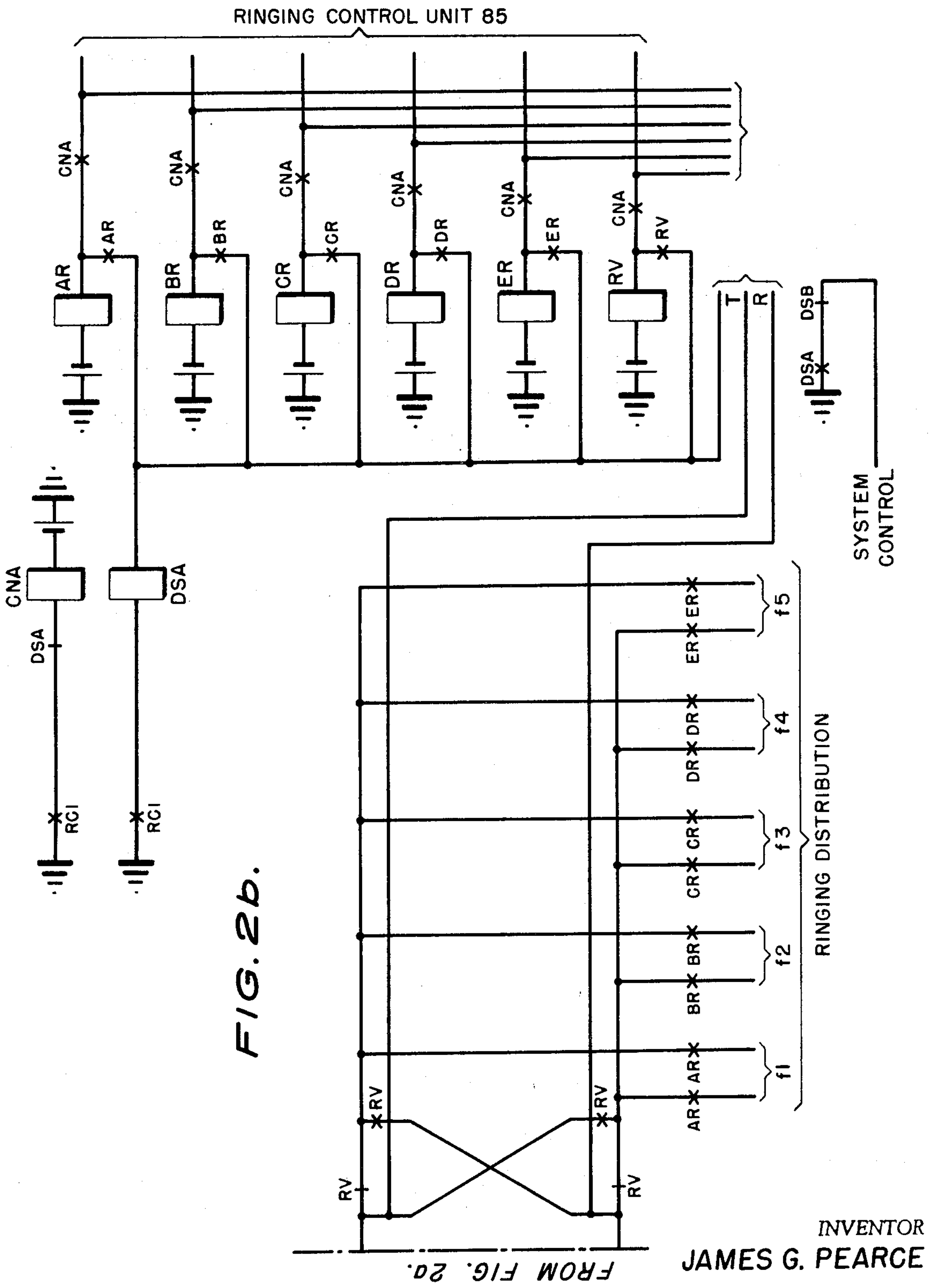

These and other objects, features and advantages of the present invention will be more apparent from the following detailed description of the invention, in combination with the accompanying drawings which illustrate one embodiment of the present invention and wherein:

FIG. 1 is a schematic block diagram of a space division electronic telephone switching system with which the present invention may be utilized; and FIGS. 2A and 2B in combination provide a schematic diagram of the revertive call arrangement in accordance with the present invention.

Referring now to the drawings, FIG. 1 illustrates a typical space division electronic telephone switching system with which the reverting call circuit of the present invention may be associated. However, it is to be understood that the present invention may be related to other systems than the one specifically illustrated in FIG. 1 and described herein, as will be apparent from an understanding of the general principles of the present invention. In fact, the reverting call arrangement of the present invention is not restricted to any particular type of known reverting call operation; for example, depending upon the telephone switching system associated with the present invention, the present invention may provide reverting call by directory number or reverting call by directory number with prefix code, or reverting call by code number and ringing digits. For the purpose of describing the principles of the present invention, a reverting call by directory number will be described herein.

In FIG. 1, one of a plurality of line circuits 10 is connected through a concentrator 15, first selector 20 and second selector 25 to transmission bridge 30 which forms a standard output junctor providing an output back to the concentrator 15 for application of local calls to a called line circuit. Outgoing traffic is connected from the output of the second selector 25 through trunk circuit 35. An allotter 40 is connected to concentrator 15 and controlled by line control 65 in the well known manner.

One of a plurality of dial pulse accepters 45 is shown in FIG. 1 as connected to the output of concentrator 15, which accepts and stores dialed impulses received from the concentrator 15 and applies this dialed information to the register sender 50 for further processing. Associated with register sender 50 is a number indicator 55 which forms a temporary memory providing a class of service COS information regarding both the called and the calling parties. The number of the called party is provided from the dialed information received through the dial pulse accepter 45 and the directory number of the calling party is received via the directory number gate 80 and the line scanner 75 connected to the line circuit 10. Class of service information is then applied from the number indicator 55 to the register sender 50 and also to a special features memory 70 which permits the storage of numbers for call forwarding and the storage of information to route calls to telephone answering services and other special functions.

There is also associated with the register sender 50 a translator 60 which is in the form of a permanent memory providing the required routing information to steer a call to its destination and also providing a translation of all dialed codes received through the dial pulse accepter 45. In response to routing information received from the number indicator 55 and translator 60, the register sender 50 effects control of the line control 65 to mark the calling and called line circuits and to apply ring back and ringing, respectively, thereto through control of ringing control 85, which is connected to transmission bridge 30. The ringing code for the particular parties involved is received from the number indicator 55 and connected directly to the ringing control 85.

The line control 65 also provides control of a revertive call circuit 90 provided in accordance with the present invention, which is also connected to the ringing control 85 and derives necessary ringing control both for the calling and called parties therefrom. The ringing generated in the revertive call circuit 90 is then applied back through the concentrator 15 to the line circuit associated with the reverting call.

The general operation of the system illustrated in FIG. 1 for establishing a communication connection between subscribers associated with different line circuits, whether local or outgoing, is sufficiently well known that a detailed description thereof herein is believed unnecessary. Therefore, the description of the operation of FIG. 1 will be related only to the case of a reverting call, which is directly applicable to the present invention.

The line scanner 75 constantly tests each line circuit to determine whether it requires connection to the register equipment to establish a path to the required subscriber. As soon as it finds such a line, the scanning operation is stopped through control from line control 65. The number of the calling line is now signalled to the number indicator 55 from the directory number gate 80 of the line scanner 75 and the number indicator 55 applies this calling number to the line control 65, which in turn marks the calling line circuit 10. The line control 65 selects a dial pulse accepter 45 at the time the originating line circuit 10 is marked. At this time, the cross points in the selected path through the concentrator 15 are closed, connecting the line circuit 10 to the dial pulse accepter 45. The calling subscriber's line is now extended directly into the register which returns dial tone and awaits receipt of dialed information from the subscriber.

In the case of a reverting call, the subscriber dials the directory number of the called party. As the class of service code is received in the register sender 50 from the dial pulse accepter 45, the code is applied to the translator 60 which returns an indication that a reverting call class of service check is requested. The fact that a call to the same line is required is then checked by a signal which extends to the number indicator 55 so that the register sender 50 may determine that in fact the calling party and called parties share the same line.

The register sender 50 then receives the dialed directory number of the called party from the dial pulse accepter 45 and signals the line control 65 to acquire the reverting call circuit 90. At the same time, the number indicator 55 at the receipt of the called number from the register sender 50 provides the proper ringing code both for the calling and called subscribers, which code is applied to the ringing control 85. The ringing control 85 stores the respective ringing codes and applies them alternately to the reverting call circuit 90 under control of the line control 65.

Referring now to FIGS. 2*a* and 2*b*, which in combination provide a schematic diagram of the reverting call arrangement of the present invention, control lines T, R, S and MK are connected from the output of the concentrator 15 into the reverting call arrangement 90 under proper control from register sender 50. A control bridge relay CB is connected across the lines T and R and serves as a means of monitoring the lifting of the receiver by any subscriber connected to the line circuit associated with the control line. There is also connected in the control line R a ring trip relay RT, which under the prescribed conditions trips ringing and releases the ringing control circuit at the proper time. The operation of RT also completes the transmission path to the subscriber.

A relay MK is provided for purposes of seizing the reverting call circuit by an electronic finder (not shown) under control of register sender 50. The electronic finder may, for example, take the form of the path finding system disclosed in my copending application Ser. No. 586,125, filed Oct. 12, 1966, now U.S. Pat. No. 3,521,002 issued July 21, 1970, which provides means for selecting a free path through all stages of the concentrator from the input to the output thereof in a step-by-step manner. As soon as a free path is found via the MK lead through the concentrator 15, the electronic finder generates the signal SZ which serves to seize a dial pulse accepter 45 and, in the case of a reverting call, a reverting call circuit 90 under control of register sender 50.

A pair of relays RC1 and RC2 are provided as ringing control relays which serve to connect one or another of a pair of ringing control circuits (one ringing control circuit shown by way of example in FIG. 2*b*) to the lines T and R, and also serve to extend ground via sleeve lead S to hold the cross-points in the concentrator 15. A relay RM is also provided in conjunction with the control bridge relay CB and serves to connect the ringing control circuit to the subscriber line circuit through the control lines T and R only under the proper conditions. An additional relay RD is provided for operation in conjunction with the relays CB and RM and serves primarily to hold the cross points to the line circuit via sleeve lead S after the calling party replaces his handset subsequent to dialing the directory number of the called party.

The ringing control portion of the circuit is illustrated in FIG. 2B. A plurality of ringing generators $f_1$ through $f_5$ (not specifically shown) are connected in parallel to the control lines T and R from a ringing distribution system of the type well known in the art. A combination of the ringing tones is applied in accordance with the ringing code both of the calling and called party through selective connection of one or more of the tone generators $f_1$ through $f_5$ to the control lines. The selective connection of the tone generators for purposes of ringing both the calling and called parties is effected through application of the particular ringing code for each of the parties from the ringing control 85 to selective control relays AR, BR, CR, DR and ER. The relay RV serves to reverse the polarity of the ringing tones to thereby increase the available ringing combinations in the well known manner.

The relays are actuated from the ringing control 85 and are held in the operated condition through connection from the relay through its own contacts to a circuit including relay DSA and the contacts of relay RC1 to ground. The ringing store for the called subscriber number and that for the calling subscriber number are identical in configuration; however, for purposes of simplicity only the store for the called subscriber is illustrated in FIG. 2B.

A relay CNA is actuated upon actuation of the relay RC1 and serves to connect the ringing store for both the calling and called subscriber numbers to the ringing control for purposes of receiving the ringing code therefrom. The relay DSA is actuated upon receipt of the ringing code from the ringing control via the holding circuits associated with each of the control relays in the called subscriber ringing store, and upon actuation thereof serves to deactivate the relay CNA and disconnect this ringing store from the ringing control 85. Actuation of relay DSA also extends ground to the register sender which initiates connection of the calling subscriber ringing store to the ringing control 85 for receipt of the ringing code therefrom.

The operation of the circuit of FIGS. 2A and 2B will provide a clearer understanding of the principles of the present invention. When the circuit is seized as a result of the line control operation described above in connection with FIG. 1, the signal SZ is generated and applied via the line control 65 to the reverting call circuit 90 and serves to operate the relay MK. The operation of the relay MK in turn causes operation of the relay RC1 or the relay RC2 depending upon the ringing control circuit which is available for use at that time. It will be assumed in the following discussion that the ringing control circuit RC1 is available and is selected. The relay RC1 is actuated upon actuation of the relay MK due to completion of the loop to ground through the contacts of relay MK and the operate winding of the relay RC1. Operation of this relay actuates the holding circuit through the contacts of the relay itself to actuate a second operate winding of the relay and also serves to operate the relay CNA connecting the ringing store for the calling number to the ringing control circuit for receipt of ringing codes therefrom. Actuation of the relay RC1 also completes connection between the ringing control circuit RC1 and the control lines T and R.

Since the calling subscriber is off hook, relay CB operates due to completion of the loop in the line circuit which extends to the control lines T and R. The operation of relay CB in turn effects operation of the relay RD, which locks through the normally closed contacts of the relay RT to ground.

The subscriber then dials the directory number of the called party subscriber, and the dialing impulses are received and processed by the register sender in the manner indicated above in connection with FIG. 1. Upon receipt of the dialed information, the register sender via the number indicator 55 applies the ringing code of the calling and called subscribers to the ringing control 85 which in turn applies these ringing codes first to the calling number store and then to the called number store (not specifically illustrated but identical in configuration to the illustrated calling number store). As a result, the appropriate relays AR through ER representing the ringing code for the particular party are set in both of the ringing stores with setting of the appropriate relays effecting holding through the holding circuits and actuation first of the relay DSA which in turn disconnects the relay CNA disconnecting the store for the calling subscriber ringing code from the ringing control circuit 85 and then a similar relay in the called number store after the ringing code is received thereby.

As soon as the calling subscriber has completed dialing, he replaces his handset and awaits application of ringing both to his phone and to that of the called subscriber. When the calling party replaces his handset, the relay CB releases operating relay RM through the normally closed contacts of the relays CB and RT and through the closed contacts of operated relay RD. The relay RM then locks through its own operated contacts in series with the operated contacts of the relay RD. Actuation of the relay RM connects the control lines T and R from the switching network through to the ringing control RC1 completing the ringing loop with the calling and called subscriber equipment alternately under control of the ringing code stored in the calling number and called number stores.

When the called subscriber answers, the lifting of the handset associated with the line circuits completes the DC loop to the relay RT operating the relay, which immediately disconnects the ringing control RC1 from the control lines T and R and trips ringing to the line circuit. At the same time, the relay CB also operates through the closed contacts of relay RT which maintains relay RD in the operated condition, thereby holding the locked condition of relay RM. Continued operation of the relay RD also locks the ring trip relay RT preventing the application of ringing to the subscriber line circuit. As a further refinement a previously recorded message can inform him that the caller will connect to the line in a moment.

When the calling subscriber no longer hears ringing applied to his telephone, he is notified that the calling party has answered the call and proceeds immediately to raise his handset thereby establishing a connection between himself and the called subscriber across the common line circuit. This condition remains until both subscribers replace their handsets.

When the call is completed and both subscribers replace their handsets, the relay CB immediately releases, releasing the relays RM and RD which in turn effects release of the relays RT and RC1 restoring the line to normal condition.

In the case that the called party does not answer the call and ringing continues for an extended period of time until the calling subscriber wishes to abandon the call, this abandonment of the call may be effected by merely lifting the handset by the calling subscriber, thereby actuating the ring trip relay RT, which subsequent thereto operates the relay CB through the closed contacts thereof connecting relay CB to lines T and R. Relays RD and RM are then retained in the operated condition in the same manner as when the called subscriber answers. By then replacing his handset, the called subscriber effects release of the relay CB thereby releasing the remaining relays in the circuit and returning the line to normal condition. The circuit is then available for another call.

While I have shown and described several embodiments in accordance with the instant invention, it is understood that the same is not limited thereto but is susceptible of numerous change and modifications as known to a person skilled in the art, and I therefore do not wish to be limited to the details shown and described herein, but intend to cover all such changes and modifications as are encompassed by the scope of the appended claims.

I claim:

1. In a telephone system including a plurality of line circuits, register means for receiving and processing dial impulses received from said line circuits, a concentrator providing a plurality of paths between said line circuits and said register means, line control means for selectively connecting said register means through said concentrator to said line circuits, and ringing control means responsive to said register means for providing individual calling and called party ringing codes relating to selected line circuits, a reverting call arrangement for signalling calling and called parties sharing a common line circuit comprising: a pair of control lines connected through said concentrator to said common line circuit in response to said line control means, control bridge relay means connected via said pair of control lines to said common line circuit to form a d.c. loop therewith so as to be actuated upon closing of said common line circuit, holding relay means responsive to actuation of said control bridge relay means for holding the connection of said pair of control lines through said concentrator to said common line circuit subsequent to opening of said common line circuit, and reverting call relay means responsive to said register means for connecting said ringing control means to said pair of control lines.

2. The combination defined in claim 1, wherein said holding relay means includes first relay means responsive to actuation of said control bridge relay means for connecting a holding ground to said concentrator to hold the connection of said control means to said common line circuit and second relay means responsive to operation of said first relay means and deactuation of said control bridge relay means for connecting said pair of control lines to said reverting call relay means.

3. The combination defined in claim 2, wherein said first and second relay means each include a holding circuit for holding said relay means operated upon being operated.

4. The combination defined in claim 2, further including third relay means connected to one of said control lines by said second relay means and actuated by said ringing control means in response to a closed loop condition in said common line circuit for disconnecting said ringing control means from said control lines and de-energizing said first relay means.

5. The combination defined in claim 4, wherein said second relay means includes normally closed contacts connecting said control bridge relay means to said control lines and said third relay means includes normally open contacts connecting said control bridge relay means to said control lines so that operation of said second relay means disconnects said control bridge relay means and subsequent operation of said third relay means again connects said control bridge relay means to said line circuit.

6. The combination defined in claim 1, wherein said reverting call relay means includes first means for generating a first ringing signal and second means for generating a second ringing signal, said first and second means being alternately actuated by said ringing control means.

7. The combination defined in claim 6, wherein said first and second means each include storage means for storing a ringing code, and third means for producing a plurality of signals of different frequency associated with both of said first and second means, said first and second ringing signals being derived from a combination of said signals of different frequency as determined by the calling and called subscriber ringing codes provided by said ringing control means.

8. The combination defined in claim 7, wherein said holding relay means includes first relay means responsive to actuation of said control bridge relay means for connecting a holding ground to said concentrator to hold the connection of said control lines to said common line circuit and second relay means responsive to operation of said first relay means and deactuation of said control bridge relay means for connecting said pair of control lines to said reverting call relay means.

9. The combination defined in claim 8, wherein said first and second relay means each include a holding circuit for holding said relay means operated upon being operated.

10. The combination defined in claim 9, further including third relay means connected to one of said control lines by said second relay means and actuated by said ringing control means in response to a closed loop condition in said common line circuit for disconnecting said ringing control means from said control lines and de-energizing said first relay means.

* * * * *